United States Patent
Rawert

(10) Patent No.: US 8,693,080 B2
(45) Date of Patent: Apr. 8, 2014

(54) FLUIDIC DISPLAY DEVICE, AND ASSOCIATED METHOD

(75) Inventor: Juergen Rawert, Neuss (DE)

(73) Assignee: Advanced Display Technology AG, Appenzell (CH)

( * ) Notice: Subject to any disclaimer, the term of this patent is extended or adjusted under 35 U.S.C. 154(b) by 516 days.

(21) Appl. No.: 12/737,786

(22) PCT Filed: Aug. 4, 2009

(86) PCT No.: PCT/DE2009/001098
§ 371 (c)(1),
(2), (4) Date: Mar. 31, 2011

(87) PCT Pub. No.: WO2010/020211
PCT Pub. Date: Feb. 25, 2010

(65) Prior Publication Data
US 2011/0181934 A1    Jul. 28, 2011

(30) Foreign Application Priority Data

Aug. 20, 2008 (DE) .......................... 10 2008 038 462

(51) Int. Cl.
*G02B 26/00* (2006.01)
*G02B 26/08* (2006.01)
*G02F 1/167* (2006.01)

(52) U.S. Cl.
CPC .......... *G02B 26/0841* (2013.01); *G02B 26/085* (2013.01); *G02F 1/167* (2013.01)
USPC .......................................... 359/290; 359/296

(58) Field of Classification Search
USPC ............................... 359/228, 290–297
See application file for complete search history.

(56) References Cited

U.S. PATENT DOCUMENTS

| | | |
|---|---|---|
| 3,566,172 A | 2/1971 | Taylor et al. |
| 4,558,314 A | 12/1985 | Fooshee |
| 5,731,792 A | 3/1998 | Sheridon |
| 6,120,588 A | 9/2000 | Jacobson |
| 7,304,786 B2 | 12/2007 | Hagood et al. |
| 7,394,598 B2 | 7/2008 | Hendriks et al. |
| 7,601,270 B1 | 10/2009 | Unger et al. |
| 7,834,845 B2 | 11/2010 | Sacher |
| 2008/0210320 A1 | 9/2008 | Unger et al. |
| 2010/0175767 A1 | 7/2010 | Unger et al. |

FOREIGN PATENT DOCUMENTS

| | | |
|---|---|---|
| DE | 697 11 750 T2 | 9/2002 |
| DE | 10 2005 008 834 A1 | 8/2006 |
| EP | 1 065 378 A2 | 1/2001 |
| WO | WO 2004/027490 A1 | 4/2004 |

*Primary Examiner* — Mahidere Sahle
(74) *Attorney, Agent, or Firm* — Marshall & Melhorn, LLC

(57) ABSTRACT

A display device uses liquids for visualizing information and comprises a plurality of display elements with cavities, at least one display liquid for displaying information, at least one liquid feeding mechanism for delivering the at least one display liquid, at least one common main duct for jointly filling a plurality of display elements, and at least one liquid reservoir for temporarily holding the at least one display liquid. The at least one liquid feeding mechanism allows display liquid to be delivered from reservoir into said display elements via the common main duct leading into at least two display elements. Each display element has at least one mechanism for influencing the surface energy of the display liquid. In the method of the invention, different feeding processes can be used for holding or delivering the desired liquid into the display elements.

22 Claims, 5 Drawing Sheets

FLUIDIC DISPLAY DEVICE, AND ASSOCIATED METHOD

BACKGROUND OF THE INVENTION

The invention relates the field of display devices for reproducing optical information. In particular, the invention relates to a display device based on the use of liquids for visualizing information, as well as an associated method.

From the prior art there is known an almost overwhelming variety of display devices serving the reproduction of optical information, such as e.g. text, still images or even moving images (videos). While a large proportion of these display devices serves in particular to reproduce multi-colored and quickly varying information, solutions exist which focus on the reproduction of more static and optionally monochrome information.

As an example for such display devices, reference is made to the technology of "electronic paper" developed by the company E-Ink (Cambridge, Mass./USA; www.eink.com). The document U.S. Pat. No. 6,120,588 ("Electronically addressable microencapsulated ink and display thereof") is mentioned in this respect. Herein, a plurality of tiny globules is used which can be oriented in an electrical field and which are, for example, colored in white and black in equal share. By specific application of certain display areas with a corresponding electrical field these areas appear to be colored, whereas other areas appear uncolored. To enhance contrast, an opposed electrical field can be applied to the remaining areas. In particular advantageous is the fact that such devices can be operated with low power, however, they offer slow reaction times and moreover the disadvantage that only a few colors can be displayed.

The problem of high energy consumption is encountered, for example, by document U.S. Pat. No. 7,304,786 owned by the company Liquavista (NL). The display principle described therein is based on use of colored liquids, more specifically of a two phase mixture made up of colored liquid (oil) and a carrier liquid (water). Switching of a single image dot occurs by means of the effect of electrowetting. By utilizing the effect of electrowetting, energy input can be dramatically lowered in particular during the representation of static information, since energy is consumed only for changing, but not for holding a color. However, such displays are suitable, on the one hand, only for operation at normal ambient temperature, on the other hand, the technology described in this document is reliable only up to a certain pixel size, so that in particular large area displays cannot be realized with such a technique. Moreover, the pixels include merely a single color, so that display of plural different colors can only be achieved by means of a close arrangement of differently colored "sub-pixels" and use of optical fusion thereof to perceive one pixel.

As substantial disadvantage of display devices which are based exclusively on the effect of electrowetting, wherein thus the entire energy change the image impression results from this effect, is founded in that these forces are very low, so that correspondingly high electrical fields are necessary to bring large liquid volumes safely into a desired display condition. Simultaneously, these display devices often use display elements ("pixels") comprising two chambers, one of them serving as a display, whereas the other one is used as a reservoir in case that the corresponding pixel is not to be displayed at the moment. These constructions are complex as well as error-prone; moreover, the magnitude of the electrical field to be generated is limited, since otherwise the dielectric strength of the used materials is exceeded by too high voltages. Solutions which utilize pumps to provide an increased liquid transport volume, can rarely be realized, since either a plurality of pumps were necessary or correspondingly complex switching valves had to enable a selection of the pixel which is to be driven, resulting in particular to extremely long switching times for an image often comprised of many thousands of pixels.

U.S. Pat. No. 3,566,172 A discloses a fluidic display including a display liquid for displaying information as well as a fluid feeding mechanism for delivering said at least one display fluid. Further, a common main duct is provided between at least one fluid reservoir and said fluid feeding mechanism.

EP 1 065 378 A2 discloses a microvalve and pump system as well as a method for manufacturing the same. The systems as described consist essentially of stacked elastic and inelastic layers, wherein a pair of adjacent layers forms an elastically deformable duct.

DE 697 11 750 T2 discloses an electrocapillary display sheet which uses several sets of reservoirs each holding a polar liquid of different color. By selectively activating the fluids of each set of reservoirs, at least one of the fluids from the set of reservoirs flows into a space which is shared by the fluids of this set of reservoirs to create a colored image dot.

SUMMARY OF THE INVENTION

Therefore, it is the object of the invention to provide a device which overcomes the disadvantages of the prior art. In particular, the device should comprise a low power input, simultaneously, however, should yield a fluid transport power per need that changing of displayed information remains in sustainable limits. In case of a static image, the display device should have no or only a very low power consumption. Finally, the device should allow, apart from a monochrome representation, representations which have different levels of brightness or are colored. Furthermore, the invention shall provide equally a method in which the device is used.

This object is solved by a device and by a method in accordance with the invention. Correspondingly, a fluidic display device is provided which comprises a plurality of display elements preferably arranged in columns and lines. While the necessary power to move the display fluid originates from one or plural pumps which fill the display elements via joint main ducts, the "holding" energy necessary to hold the display liquid originates from an effect which influences the surface energy of the display liquid, such as, particularly preferred, the effect of electrowetting.

Further preferred embodiments can be found in the dependent claims as well as in the following detailed description and in the figures.

The device of the invention embodied as a fluidic display device includes in a "basic version" a number of components or groups of components which are in detail described below.

Firstly, the display device comprises a plurality of display elements. Each of these display elements serves to represent an image dot ("pixel"). This image dot is essentially formed by a cavity which is visible by a viewer. The image dot is "on" or "off" according to the filling level of the cavity.

To fill the cavity, the device includes at least one display liquid. This display liquid can preferably be colored, so that by filling with the display liquid, the image dot displays the corresponding color. Plural display liquids can be provided, wherein according to the display liquid as selected, the corresponding color or the corresponding shade or brightness level are displayed. Thereby, certain image dots can be filled only with a first, others only with a second display liquid.

However, it is also possible to fill an image dot successively with different display liquids, wherein it goes without saying that in this case corresponding means for selecting the display liquid are to be provided.

For feeding said at least one display liquid, the device further comprises at least one liquid feeding mechanism. Principally, all liquid feeding mechanisms known from the prior art or to be developed in future are considered. In particular preferred thereby are micropumps, in particular piezomembrane actuated micropumps. Conceivable, however, are equally other methods, such as e.g. electroosmotic methods or expansions caused by temperature gradients for delivering the display liquid. One advantage of the invention is founded in the fact that the considerable feeding power with respect to large area displays can be provided by correspondingly sizable pumps. A good scalability of the device according to the invention for different application fields is enabled thereby. The liquid feeding mechanism can thereby be selectively contained in the fluidic display device or can be associated thereto as an external mechanism.

Further the device according to the invention includes at least one common main duct for simultaneously filling a plurality of display elements. Thereby, this main duct is constructed to fluidically connect plural of the display elements. In this way, plural display elements can be combined into one or plural groups, wherein each group may be associated with its own main duct.

Each of these main ducts is connected to at least one liquid reservoir for temporarily receiving said at least one display liquid. It is clear that for a plurality of display liquids, the same number of liquid reservoirs is to be provided, if the several display liquids are not allowed to mix or to come into contact otherwise.

For displaying an image dot, display liquid is fed, by means of said at least one liquid feeding mechanism, from said at least one liquid reservoir via the common main duct into which plural, however at least two display elements lead, into these display elements and sucked from these elements, respectively. Therefore, it is preferred that said liquid feeding mechanism can operate bidirectionally or that by corresponding valves or the like a quasi bidirectional operation is enabled. Suction is provided, so that a filled image dot, which is "on", can be emptied again, i.e. switched "off". By coupling plural display elements by means of said common main duct, these can be filled and emptied jointly and therefore in a time-saving manner.

In order to empty only those display elements during emptying the respective display elements which in fact are to be "switched off", each display element of said device includes according to the invention at least one mechanism for influencing the surface energy of the display liquid. By influencing the surface energy of the display liquid present in the display element, its wetting behavior is changed. By an enhancement of wetting between display liquid and inner wall of the cavity, the display liquid is "trapped" during a common emptying procedure in the cavity and remains therein, whereas in case of degraded wetting, the display liquid can very easily (for example with a particularly low pumping power) be sucked from the respective cavity. To support this effect, corresponding fluidic barriers, e.g. in form of neckings or specific coatings, can be provided between said cavity and said main duct.

According to a preferred embodiment, the so called electrowetting effect is used to influence the surface energy. To do so, the display liquid can be influenced in its surface energy by an electric field. To generate this electric field, the respective mechanism for influencing the surface energy includes respectively at least one electrode which is arranged in the respective display element such that an electric field can be applied to the display liquid which is present in a respective display element. In other words, the display liquid is subjected to a switchable electric field in which it varies its surface energy and therefore its wetting behavior.

The display liquid may thereby consist of a color carrying liquid alone, or it can be embedded into an (electrically inert) carrier fluid. In particular, as liquids electrically activating the display liquids, liquids from the group comprising the substances propylene carbonate, diethyl carbonate, diacetone alcohol, cyclohexanone, butyl acetate, propyl acetate and ethylhexanol are considered, whereupon said electrically inert fluid preferably originates from the group comprising the substance group of gases, oils or oil containing liquids, respectively, and fluor containing liquids. In particular preferred, however, no silicon oil is used as the carrier fluid.

According to a further preferred embodiment, it is provided that said display elements are arranged in at least one column. Of course, the number of columns depends on the type of information to be displayed; therefore it is particularly preferred that plural columns according to the invention are placed adjacent to another. Thereby, all display elements of a respective column are connected to another by means of a common main duct, so that the corresponding display liquid can be supplied to and sucked from the display elements of the respective column via the respective main duct. In this context, it can be referred to a matrix like column arrangement of the display elements. It can be provided that all main ducts are connected to a single common liquid reservoir or that, for example, each column comprises its own liquid reservoir. Equally, it may be preferred that columns are connected to a common display liquid feeding mechanism or that, for example, each column comprises its own display liquid feeding mechanism. Combinations of these embodiments are conceivable, wherein, if need be, corresponding means for selecting the respective column(s) or liquid reservoirs, respectively, are provided.

According to one embodiment, the display device comprises a plurality of columns of display elements, wherein all mechanisms for influencing the surface energy can be controlled separately. This means that each display element comprises (at least) one own and separately controllable mechanism for influencing the surface energy, so that, when simultaneously emptying the cavities, all display elements can be switched "on" or "off", respectively, simultaneously. In this way, a particular time-saving switching of the entire display device is possible. This embodiment can, therefore, to the point be referred to as "active matrix".

According to a further embodiment, the device according to the invention also includes a plurality of columns of display elements and further a means for selecting columns or a corresponding number of liquid feeding mechanisms. By using said means for selecting columns it is possible, if only one single display liquid feeding mechanism is present, to fill specific columns and not all of them simultaneously, with display liquid. Alternatively or even additionally, a corresponding number of liquid feeding mechanisms may be provided, so that each of said columns includes its own liquid feeding mechanism, so that by means of specific controlling of a specific liquid feeding mechanism only the corresponding column is filled. Additionally, it is provided thereby that the respective mechanisms for influencing the surface energy can be controlled jointly line by line. This means that adjacent display elements of different columns may be associated to the respectively same mechanisms for influencing the surface energy. If, for example, in a rectangular display device according to the invention, the columns are oriented from top to bottom, said means for influencing the surface energy extend from the right hand side to the left hand side.

Advantageous in this embodiment is the lower number of mechanisms for influencing the surface energy which are to be controlled, since within the scope of the above example only mechanisms for influencing the surface energy corresponding to the number of lines included in the display device are necessary, and it is no need any more that they correspond to the product of lines and columns, in other words to the number of the display elements.

A disadvantage, however, lies in the fact that now an update of the display device can only be performed column by column, since a corresponding selection of the respective display elements is only possible in this manner. For this reason, it can be referred to a "passive matrix". A detailed explanation of the process will be found further below in the context of the description of the method according to the invention.

Preferably, the display elements are configured essentially two-dimensional. Particularly preferred is a rectangular and in particular square configuration. In this context, "two-dimensional" means that the dimensions of the cavity in respective spatial directions which are about perpendicular to a viewing direction, are considerably larger as seen in viewing direction. The cavity is correspondingly configured "shallow".

Alternatively, the cavity may be configured three-dimensionally, may therefore comprise a comparable dimension also in a viewing direction or may even be configured "rod-like". In this way, differently thick layers of display liquid in a cavity can be used to generate different color saturations or brightness levels. To achieve this, for example, the voltage for generating the electric field may be increased or decreased, to achieve different wetting results and thus different amounts of display liquids "trapped" in the cavity.

For the preferred instance of a device according to the invention described further above using the effect of electrowetting, it is preferred that the respective at least one electrode of a display element (viewed in viewing direction) is arranged in front of and/or behind and/or laterally to the cavity of the respective display element.

"In front of" the cavity means that, as seen in viewing direction, the electrode is arranged at first, "behind" the cavity, that the order is reversed. In the first case, it is in particular preferred that the electrode consists of a transparent material, as it is for example known from LCD technology. "Laterally" at the cavity means that the electrode extends approximately in viewing direction, the viewer therefore virtually looks onto an edge of the electrode. In this instance, it is not necessary that the electrode is comprised of a transparent material.

Thereby, it is also conceivable that (in particular in the instance of a "passive matrix") a laterally arranged electrode simultaneously powers adjacent display elements. In this way, the number of electrodes can be cut by half.

As already described, it is provided according to one embodiment that each display element comprises only one electrode or that, if plural electrodes are present, the electrical field builds up between these electrodes and the environment. In order to exercise a better control over the forming electric field, it is therefore preferred to provide one or more counter electrodes which are arranged such that the cavity and optionally the display liquid is present between the electrode(s) and the counter electrode(s). Thereby, the display device may comprise a large area common counter electrode or single display elements or groups thereof may include their own counter electrodes.

According to an alternative embodiment, the counter electrodes may be present in the same plane as the electrodes and may be arranged, for example, mutually in parallel side by side, or a common counter electrode may circularly extend at the border of a display element.

According to a further embodiment, those portions of the fluidic display device which come into contact with display liquid are partly or totally hydrophobically and/or hydrophilically coated. In this way, the wetting behavior can additionally be controlled, so that in particular effective influence is possible.

According to a further embodiment, at least one means for equalizing pressure of the cavities of the display elements is included. If display liquid is introduced into a cavity and if the fluid volume (e.g. air or a carrier fluid) which is pushed off cannot escape, a back pressure will build up which steeply increases for increased filling. A correspondingly higher necessary feeding pressure results, as well as the necessity of a corresponding mechanical stability of the display elements which have to withstand the pressure. Therefore, it is preferred either to trap the pushed volume temporarily at another place (which is not visible) (trapping reservoir) or (in particular in case of air as pushed volume) to provide vents from which the pushed volume may escape and by which it can flow back during subsequent sucking of the display liquid since otherwise similarly a lower pressure would build up in the cavity of the display element. Thereby, it is in particular preferred to create a circular fluidic flow which makes the pushed volume flow back into the display liquid reservoir via corresponding ducts, so that a substantially unpressurized, but closed fluidic (circuit) system results.

According to a further preferred embodiment it is provided that a plurality of display elements may be combined to form "tiles". A "tile" according to the invention therefore includes a plurality of display elements, one or more main ducts, said mechanisms for influencing the surface energy and, as an option, also display liquid reservoir(s) as well as display liquid feeding mechanisms. It may however be provided that individual tiles do not have an own display liquid reservoir and/or a display liquid feeding mechanism, but are fluidically connected to tiles adjacent thereto, so that, for example, display liquid reservoirs and/or display liquid feeding mechanisms which are arranged at the periphery of the display device may be used to operate a plurality of tiles. To do this, corresponding interfaces of fluidic and/or electric type must be provided. Thereby, a tile may be consist of only one column; preferably, however, a tile has a rectangular and in particular preferably a square format and then includes the same number of columns as display elements are provided in one column.

According to a preferred embodiment, a tile according to the invention or the entire display device, in case it includes only one single tile, is arranged in layers. These layers are:
- a transparent cover layer which is common to all display elements at least in the region of the cavities of the display elements,
- a patterned chamber layer having partitions to constrain the individual display elements,
- a common bottom layer for fluidic closure.

The respective one tile thereby includes, for fluidically feeding all display elements, further either
- a patterned main duct layer or
- main ducts which are integrated into the chamber layer.

The cover layer may in particular preferably be made of plastic or of glass and may be embodied as a rigid substrate-like plate or as a sheet. It covers all display element jointly and is, for example, by means of adhesion or welding technique, applied to the underlying layer.

The chamber layer comprises or forms by definitions the cavities of the display elements or serves to constrain them from another, respectively. It is particularly preferred to form this layer as a grid-like layer, wherein grid bars form the partitions between individual display elements. The individual cavities may, as requested, comprise a square, a rectangular, a honeycombed shape or any other shape, preferably a regular shape. Areas may be provided which do not create any cavities, for example in case of a display device adapted to specific apparatus wherein the display elements are not needed holohedrally, but only partially, wherein the display device, however, due to economic considerations, is manufactured as a whole and not as comprising plural separate units.

The common bottom layer serves to fluidically close the tile and can preferably be made from the same material as the cover layer, so that it can be joined to the main duct layer using the same techniques.

The necessary fluidic feeding of all display elements according to the invention of the respective one tile is achieved by means of corresponding main ducts. These can be performed in two different ways.

According to a first embodiment, the main ducts are arranged in a separate main duct layer. The main duct(s) serving to fluidically connect the display elements to the display liquid reservoir for example column by column, are arranged in this main duct layer. It is particularly preferred to configure this layer also as a grid so that it can be manufactured in a particularly simple manner.

According to a second embodiment, the main ducts are integrated into the chamber layer. This means that the main ducts are not arranged in a separate layer underlying the chamber layer, but are present essentially in the same plane as the cavities of the display elements. It is particularly preferred to configure the partitions so that they receive the main ducts and that, if required, corresponding openings in the partitions may be provided through which the display liquid may flow into the cavities or out of the cavities, respectively. In this way, the number of total layers of which a tile according to the invention is composed, is decreased, thereby decreasing material costs and also joining and adjusting efforts when manufacturing the device according to the invention.

Finally it may be provided that the display liquid reservoir (s) are arranged in a reservoir layer provided therefore. Thereby, individual reservoirs may be separated by partitions or may be configured as a large contiguous volume, as it is in particular preferred.

As an alternative to the constructive subdivision as described, the subdivision into layers may merely be of functional nature, i.e. constructively plural layers consist of one and the same component which is then for example patterned layer by layer or, as in the case previously described, configured in an integrated manner.

Thereby, it is in particular preferred that the device according to the invention further includes a layer for receiving the respective mechanism(s) for influencing the surface energy together with a passage for each display element. As an alternative, the respective mechanism(s) for influencing the surface energy can be applied in form of metal coatings onto the respective layers, for example by evaporation, sputtering, galvanic coating etc. In this case, it may again be referred only to a functional layer, which however, is not present as an individual component.

According to the invention it is preferred that the device comprises means which make it easier to recognize the state of the display elements. Therefore, it is preferred that the common bottom layer includes active and/or passive illuminating means and that all further layers are at least partially transparent and/or opaque. Passive illumination means are for example reflection layers or the like, which do not illuminate themselves but reflect incident light. Active illumination means are for example light emitting diodes (LEDs), organic LEDs (OLEDs) as well as other in particular two-dimensional illuminating substances.

It may also be provided that the device according to the invention includes both types illuminating means to operate for example in darkness with active techniques and during the day with passive techniques to save energy.

According to another preferred embodiment, the device according to the invention comprises plural chamber layers and, optionally, main duct layers which are stacked upon another and therefore form stacked "display layers". It is clear that in this case only the bottom layer of the bottom most layer which is furthest away from the viewer must be non-transparent or opaque, since otherwise only the uppermost "display layer" which is closest to the viewer, would be visible.

This configuration is in particularly reasonable if the single chamber layers may be filled with differently colored display liquids. Due to the stacked display elements and bottom most lying illuminating means the impression of mixed colors occurs, so that the display device is not restricted to the reproduction of monochrome images. But even when using similar display liquids, a different impression of brightness, color or saturation can be created by plural separate layers. Depending on the desired color space on which the display device is based, for example three (e.g. RGB, CMY) or four (e.g. CMYK) "display layers" are needed.

It is added that also here only a functional, but not compulsorily constructive separation of the single layers occurs; for example, the bottom layer of a first "display layer" can simultaneously be the cover layer of the underlying "display layer". An integrated configuration, as described above in the case of a common chamber and main duct layer, is also conceivable.

According to a preferred embodiment, each display element comprises plural mechanisms for influencing the surface energy, wherein said mechanisms for influencing the surface energy extend, for example, strip-shaped within the display element. Depending on whether the configuration is "active" or "passive", these for example strip-shaped mechanisms for influencing the surface energy, which in a particularly preferred manner are embodied as electrodes, also extend into the display elements of adjacent columns, if present. By arrangement of plural means for influencing the surface energy within one display element, the area, at which the display liquid is "held" during suction, may be varied and consequently also the volume of display liquid. In this way it is possible, to create for example different grey of color levels, respectively, in a display element. Alternatively or additionally, variation of intensity when controlling the mechanisms influencing the surface energy may be used to create respective grey of color levels, respectively.

According to a particularly preferred embodiment, a fluidic display device manufactured according to the teachings of the invention basically includes a large number of separately controllable mechanisms for influencing the surface energy of the display liquid per display element or per line of display elements, respectively, so that at first a correspondingly fine resolution in view of grey or color levels, respectively, can be achieved. In case that a lower resolution is desired, a respective number of separately controllable mechanisms for influencing the surface energy (e.g. electrodes) can be connected together without any extensive constructive modifications. Then, the decision in view of a resolution which may be achieved must not be made during design but only during manufacturing. Furthermore, the number of different components can be drastically reduced in this way.

The invention further provides for a method which is to be performed preferably using the device according to the invention.

Accordingly, a method for displaying information is concerned wherein an image to be displayed can be divided into single image dots which in turn can be displayed by display elements. This largely corresponds to the known display type from the prior art by using a plurality of image dots, such as e.g. digital computer displays and the like. To perform the method according to the invention, the following basic steps are provided:

(a) At first, the respective display liquid is delivered from the display liquid reservoir to respective cavities of the display elements via the main duct(s). It is clear that in case of presence of plural different columns in which display elements are arranged, depending on the "active" or "passive" option as described above, previously, as required, a selection of the respective columns must occur. As soon as all corresponding display elements are filled with display liquid, the display liquid feeding mechanism used for feeding can be stopped.

(b) Subsequently, the respective mechanism(s) for influencing the surface energy of the display liquid are switched on, for example (in case of using the effect of electrowetting) the respective electrodes are supplied with power, so that at respective sites within the display elements display liquid is retained.

(c) Thereafter, preferably also by using said display liquid feeding mechanism, excessive display liquid is sucked from the respective display elements. "Excessive" thereby is defined that all display liquid which is not needed to display the desired image or the desired information (or is even hampering) must be removed from the visible part of the cavities of the display elements. The display liquid may be fed or sucked into a further reservoir or particularly preferred back into the main ducts and into the display liquid reservoir connected thereto. During this step, the respective mechanisms for influencing the surface energy remain switched on. Thereby, display liquid is retained in the region of the corresponding display elements.

(d) After having removed all excessive display liquid from the visible region of the cavity of the display elements, said mechanisms for influencing the surface energy of the display liquid as well as said display liquid feeding mechanism(s) can be switched off. The image to be displayed has therefore been "updated", and display of the image can be maintained without supply of energy, as long as no supplemental (active) illumination is necessary.

The specific advantage of the method according to the invention consists in that power for selecting the desired image dots or for "holding" the liquid in corresponding cavities during emptying, respectively, is low, provided, for example, the effect of electrowetting is used. In return, power which is necessary for filling and emptying the display elements, is substantially higher, however, a single correspondingly dimensioned display liquid feeding mechanism, such as e.g. a pump, can be utilized. In other words, the advantage of the method of the invention lies in separating the feeding and the "holding" function and thus in the possibility of combining two feeding techniques wherein a specific task is assigned to each of them, so that they can be utilized in a particularly preferable manner.

Consistent with the "active" type described above, the corresponding method according to the invention further includes a step wherein, prior to the other steps as described above, a simultaneous selection of a plurality or of all columns of display elements to be filled occurs so that thereafter, plural or all columns and therefore display elements are filled simultaneously, and the respective mechanisms for influencing the surface energy of the display liquid can be controlled simultaneously. In this way, a very time saving update of the image to be displayed is possible, in particular if all columns can be filled and emptied simultaneously.

In contrast thereto, consistent with the "passive" type as described above, the corresponding method according to the invention further includes a step wherein a specific column of display elements to be filled is selected. In this way, only this column and thus its display elements are filled jointly thereafter. This is achieved in particular also if the respective mechanisms for influencing the surface energy are jointly controllable line by line. Even already updated columns into which the mechanisms for influencing the surface energy also extend and their mechanisms for influencing the surface energy being now again switched on, do not change the image as displayed, since there is no movement of display liquid in the corresponding columns (which are not selected). Now, to update respective further columns optionally provided, the process is repeated with prior selection of a further specific column which is to be filled, namely until all desired columns are selected. Normally, all columns of a display device are correspondingly updated consecutively; it is, however, also conceivable that only a part of the columns is updated, namely for example if only parts of the image must be modified, whereas other parts can remain unmodified.

To update a whole image, independent of the "active" or "passive" type, it is provided according to the invention that the method according to the invention includes further at least one of the following steps, in case the corresponding components are present:
optionally, selection of the tile to be filled;
optionally, selection of the chamber layer to be filled and the display liquid.

These steps must also be performed prior to the filling process (step (a)). Also, the entire sequence of steps must be repeated until the desired number of tiles and/or chamber layers has been updated.

It is clear that depending on the concrete configuration of the device, hybrids or deviations which are not explicitly described are conceivable without departing from the basic principle of the invention.

DETAILED DESCRIPTION OF THE INVENTION

Figure 1A:
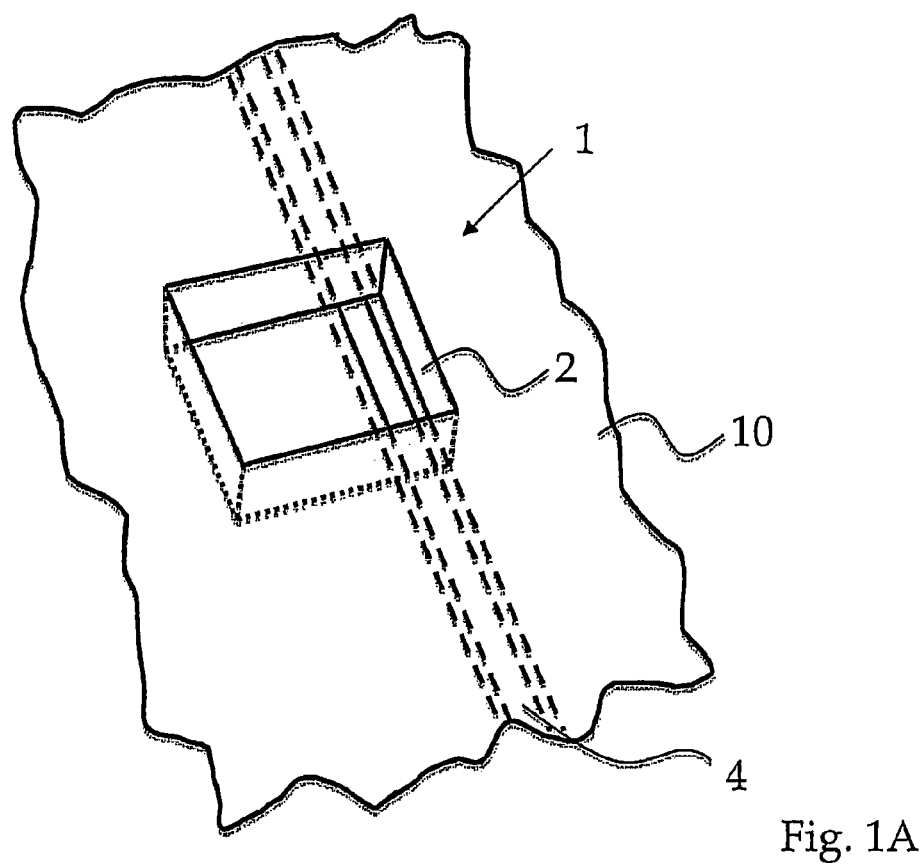
FIG. 1A shows a display element of the device according to the invention, which has been constructed according to the invention.

FIG. 1A shows the example of a display element 1 of the display device which is constructed according to the invention. Display element 1 consists of a cavity 2 located in a played-like material forming chamber layer 10. For sake of clarity, however, only one single display element 1 is illustrated.

Main duct 4 is located below display element 1, through which display liquid 22 can flow from the liquid reservoir 20 into and out of the cavity 2 of said display element 1. In the embodiment as represented, main duct 4 immediately boarders to display element 1, so that creation of a separate passage is not necessary.

Figure 1B:
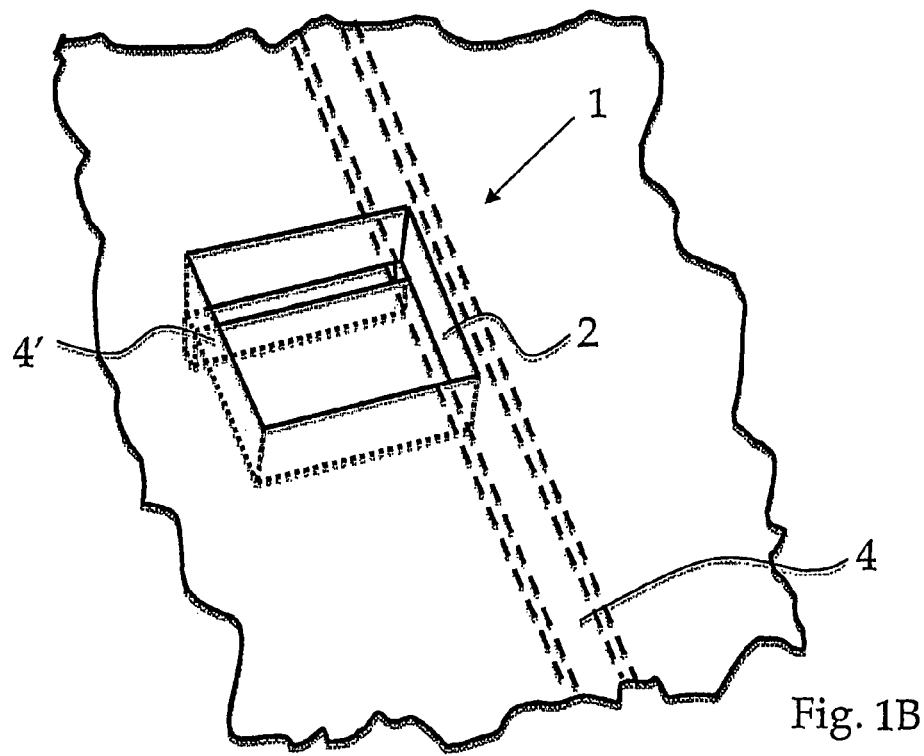
FIG. 1B shows a display element of the device according to the invention constructed according to the invention with a transverse duct.

In FIG. 1B a display element 1 is shown which is connected to main duct 4 via a transverse duct 4' radiating from main duct 4 at an angle of about 90°. Such configuration enables under certain circumstances a better controllability of the structures responsible for entering and exiting, since a relative small cross section is sufficient for the input portion of transverse duct 4', whereas main duct 4 normally must supply a plurality of display elements 1 with display liquid, so that a correspondingly large dimensioned cross section is needed. By this constructive decoupling, the cross sections may be varied independently in a simple manner.

Figure 2A:
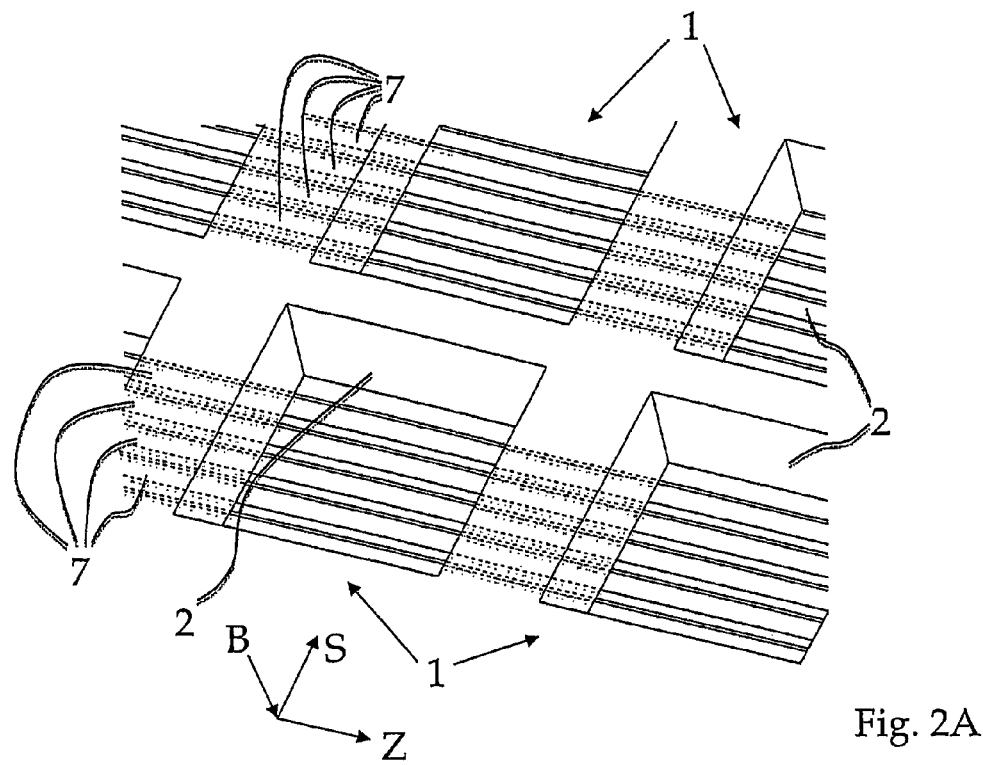
FIG. 2A shows plural display elements constructed according to the invention having continuous electrodes in a perspective view.

FIG. 2A shows plural display elements 1 constructed according to the invention having continuous electrodes 7 in a perspective view. The arrangement of display elements 1 is column by column (column direction S) and line by line (line direction Z), wherein both direction S and Z enclose an angle of about 90°. The viewing direction of a viewer using the device according to the invention is indicated by viewing direction B which is substantially perpendicular to both directions S and Z.

A plurality of parallel extending electrodes 7 can be recognized through the cavity 2 of each display element 1. These electrodes extend line by line through plural display elements 1 present in the same line (hidden regions are illustrated in dashed lines). Merely, those sites where fluidic connections to main ducts 4 are situated (not illustrated), are not occupied by electrodes.

Figure 2B:
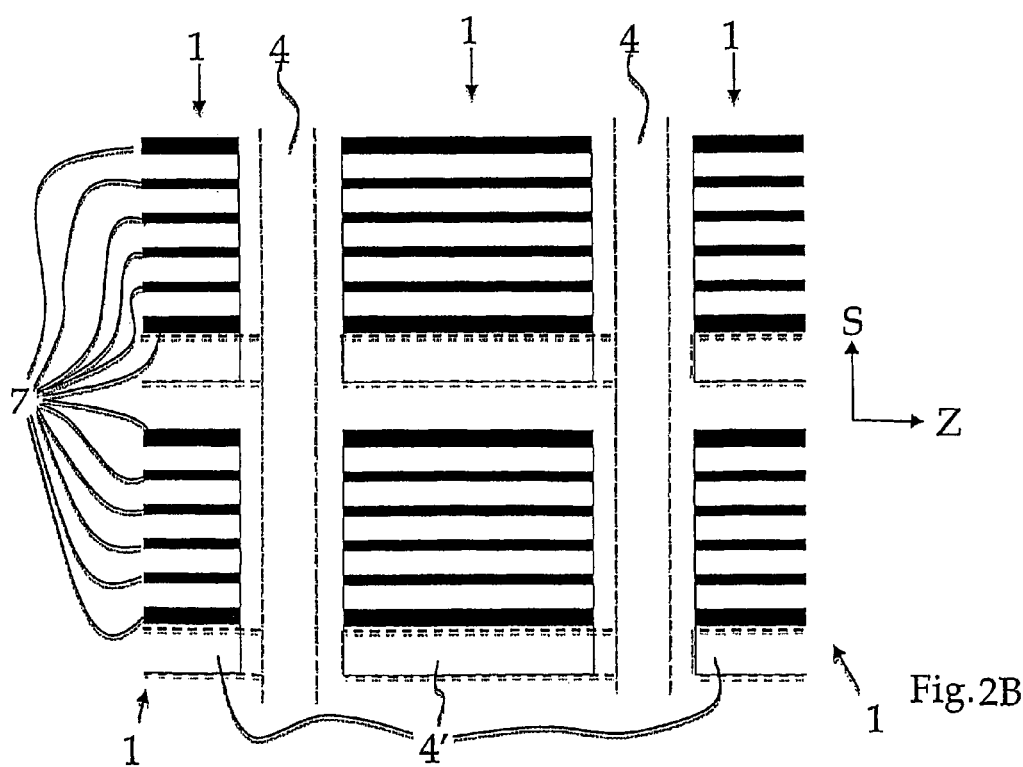
FIG. 2B shows the display elements of FIG. 2A in a top view.

FIG. 2B shows the display elements of the FIG. 2A in a top view. Through the cavities in the chamber layer (not specifically indicated) electrodes 7 (illustrated in black color) and transverse ducts 4' radiating line direction Z from main ducts 4 extending in column direction S may be recognized (respectively illustrated in dashed lines).

Figure 3:
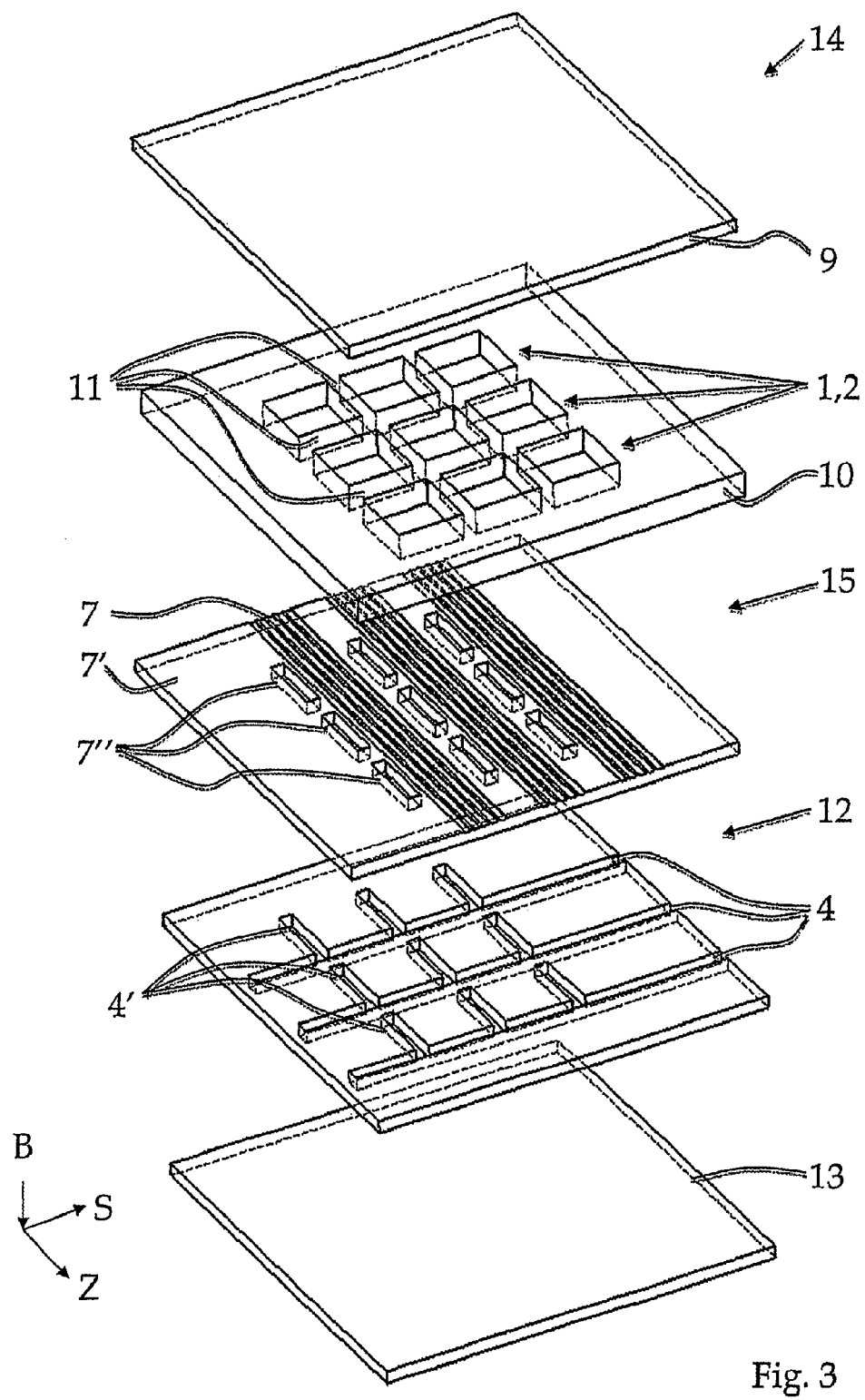
FIG. 3 shows an exploded view of an embodiment of the device according to the invention provided in a layered configuration.

FIG. 3 shows in an exploded view an embodiment of the device of the present invention configured as "tile" 14 which is present in a layer configuration. Uppermost illustrated is a cover layer 9 covering all display elements 1 of tile 14. Underlying is a chamber layer 10 including cavities 2. Grid-like partitions 11 are located between cavities 2, constraining individual display elements 1 from another. There is an electrode layer 15 (general term: "layer for receiving the mechanism(s) for influencing the surface energy") underlying chamber layer 11, wherein this electrode layer 15 consists of actual electrodes 7 and an electrode support layer 7'. In the embodiment as represented, electrodes 7 are formed continuously in a line direction Z, so that an electric connection to optionally provided adjacent tiles 14 (not represented) is possible. As a fluidic connection between chamber layer 10 and a main duct layer 12 underlying electrode layer 15, passages 7" to transverse ducts 4' are arranged at respective sites of electrode support layer 7'. There is a main duct layer 12 underlying electrode layer 15. Similar to chamber layer 10, it consists of a plate-like material into which the corresponding duct structures are introduced. In the embodiment as represented, main ducts 4 extending in a column direction S are shown together with transverse ducts 4' radiating therefrom at an angle of 90°. Transverse ducts 4' thereby are arranged such that they lie below passages 7" of electrode support layer 7'. For sake of simplicity, ducts of main duct layer 12 can be structured down; alternatively, it is also possible that they (for example for reasons of stability) comprise a depth which is smaller than the thickness of main duct layer 12. For a fluidic closure of the represented tile 14 a bottom layer 13 is arranged at its bottom side which fluidically seals main duct layer 12. This bottom layer 13 may preferably consist of reflective material or comprise a thin coating thereof, so that light which impinges from viewing direction B through cavities 2 and optionally display liquid (not illustrated) present therein is reflected back to the viewer to thereby improve the visibility of the content of the respective display element 1. Not illustrated is an optionally present illuminating layer underlying bottom layer 13 from which light for example created by surface irradiators is irradiated in direction of the viewer.

Figure 4:
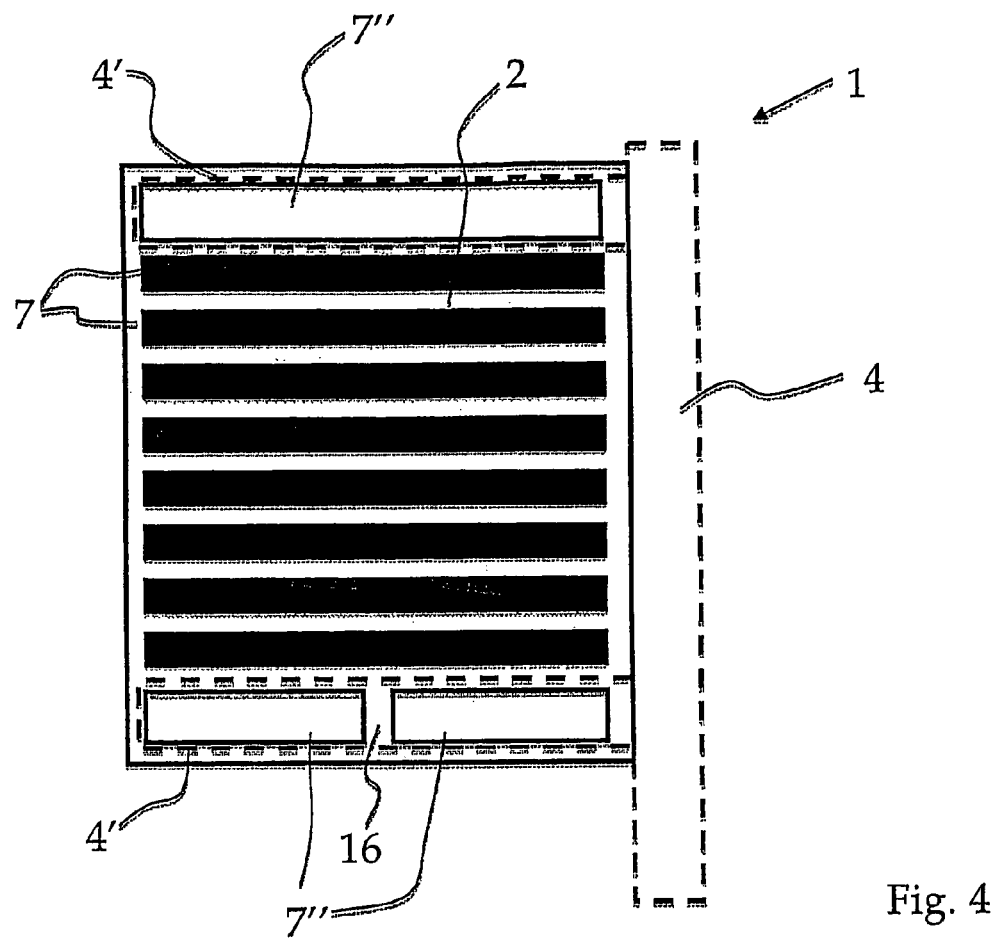
FIG. 4 shows a top view of an embodiment of the device according to the invention having two divided passages.

A top view of an embodiment of the device according to the invention is shown in FIG. 4, wherein each display element 1 is provided with two separate passages 7" arranged above transverse ducts 4' which in turn discharge into the single main duct 4 illustrated here (ducts respectively illustrated in dashed lines). The advantage of two passages 7" per display element 1 consists in that in particular when sucking excessive display liquid away, it is uniformly transported out of cavity 2 of display element 1, so that also forces acting on the remaining display liquid act symmetrically and equally in both directions. In this case, it is reasonable to switch off respective electrodes 7 (illustrated in black color) first at the periphery, i.e. in proximity of filling opening 7" and only finally in a center region to keep the display liquid preferably in a center region.

In order to avoid that the display liquid remaining in cavity 2 typically forming a round droplet does not automatically (for example by vibrations) flow through passages 7", they may be subdivided by means of a respective separating bridge 16, so that, as illustrated in the bottom part of display element 1, instead of a large passage, two (or more, if necessary) small passages 7" form which of course then will discharge into one and the same transverse duct 4'.

Figure 5:
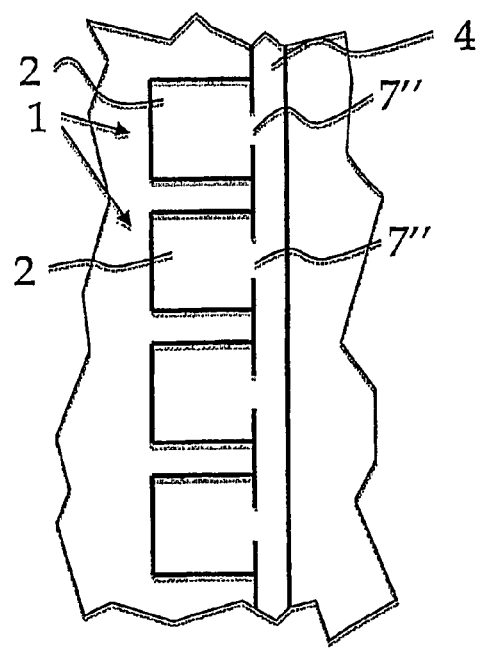
FIG. 5 shows an example of integration of chamber layer and main duct layer into a common layer.
Figure 6:
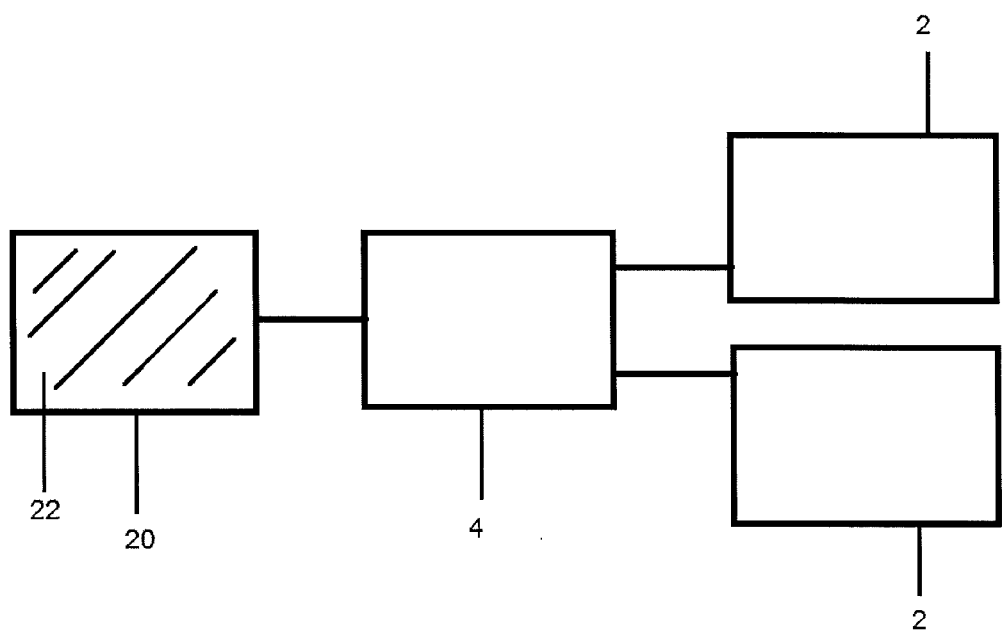
FIG. 6 shows a schematic view of a device according to the invention.

An example of integration of chamber layer and main duct layer into a common layer is shown in FIG. 5 in a top view. By arranging main duct 4 laterally to cavity 2 of display element 1 and corresponding passages 7", display liquid (not illustrated) may flow into cavity 2 and out again. The embodiment as illustrated serves as an exemplary illustration and is therefore not optimized, neither in view of a particularly good capability to be filled nor other features addressed in this description.

The device according to the invention and the method according to the invention in particular offer the advantage via the prior art that different feeding techniques for holding display liquid in display elements and for feeding the same into and out of the display elements, respectively, may be utilized. Thereby, the device comprises a low power consumption, however is simultaneously capable to yield a liquid transport power, as needed, such that modification of displayed information remains inacceptable limits. In case of a static image, the fluidic display device does not have any or only a very low power consumption. Finally, apart from monochromic representation, the device enables representations of different levels in brightness as well as colored representations. Mass production is possible due to the simple basic modules, and due to the flexibility of arranging plural "tiles" comprising groups of display elements, the concept is suitable for small as well as for large area displays.

The invention claimed is:

1. A fluidic display device, including
a plurality of display elements having cavities,
at least one display liquid for displaying information,
at least one liquid feeding mechanism for delivering the at least one display liquid,
at least one common main duct for jointly filling a plurality of display elements and
at least one liquid reservoir for temporarily holding the at least one display liquid, wherein
by means of the at least one liquid feeding mechanism display liquid can be delivered from said at least one liquid reservoir into said display elements via the common main duct into at least two display elements and to be sucked out thereof, wherein each display element comprises at least one mechanism for influencing the surface energy of the display liquid.

2. The fluidic display device of claim 1, wherein said display liquid can be influenced in its surface energy by an electric field and that said mechanism for influencing the surface energy includes at least one electrode which is in a respective display element such that an electric field can be applied to the display liquid present in the respective display element.

3. The fluidic display device of claim 1, wherein said display elements are arranged in at least one column, wherein all display elements of a respective column are connected via a respective common main duct, said display liquid can be delivered into said display elements of the respective column and can be sucked therefrom via said common main duct.

4. The fluidic display device of claim 3, wherein it includes a plurality of columns of display elements, wherein all the mechanisms for influencing the surface energy are separately controllable.

5. The fluidic display device of claim 3, wherein it includes a plurality of columns of display elements and further means for column selection or a respective number of liquid feeding mechanisms, wherein the respective mechanisms for influencing the surface energy are jointly controllable line by line.

6. The fluidic display device of claim 1, wherein said display elements are essentially two dimensional.

7. The fluidic display device of claim 1, wherein said display elements are essentially three dimensional.

8. The fluidic display device of claim 2, wherein the respective at least one electrode of a display element is respectively arranged in front of or behind or laterally to said cavity of the respective display element.

9. The fluidic display device of claim 2, wherein said further one or plural counter electrodes are provided.

10. The fluidic display device of claim 1, wherein those portions of the fluidic display device coming in contact with display liquid are partly or fully hydrophobically or hydrophilically coated.

11. The fluidic display of claim 1, wherein at least one means for pressure equalization of said cavities of the display elements is provided.

12. The fluidic display device of claim 1, wherein a plurality of display elements can be combined to form tiles and that the fluidic display device includes at least one tile.

13. The fluidic display device of claim 12, wherein a respective tile includes the following layers:
a transparent cover layer common to all display elements at least in the region of the cavities of the display elements,
a patterned chamber layer having partitions for constraining individual display elements,
a common bottom layer for fluidic closure,
wherein the respective one tile for fluidic delivery of all display elements further includes either
a patterned main duct layer or
main ducts integrated into said chamber layer or
a reservoir layer as well as passages to said display elements.

14. The fluidic display of claim 13, wherein a layer for receiving the respective mechanism for influencing the surface energy with passages is provided for each display element.

15. The fluidic display device of claim 13, wherein said common bottom layer includes active and/or passive illuminating means and that all further layers are at least partially transparent and/or opaque.

16. The fluidic display device of claim 13, including plural stacked chamber layers.

17. The fluidic display device of claim 13, including plural stacked main duct layers.

18. The fluidic display device of claim 1, wherein each display element includes plural mechanisms for influencing the surface energy.

19. A method for displaying information, wherein an image to be displayed can be divided into single image dots which can be displayed by display elements, utilizing the device of claim 1, and including the following steps:
(a) delivering the respective display liquid from the respective display liquid reservoir via said main duct(s) to the respective cavities of said display elements;
(b) activating respective mechanisms for influencing the surface energy of the display liquid, so that display liquid is retained at respective sites;
(c) sucking excessive display liquid from respective display elements; and
(d) deactivating said mechanisms for influencing the surface energy of said display liquid.

20. The method of claim 19, utilizing a device comprising a plurality of columns of display elements, wherein all the mechanisms for influencing the surface energy are separately controllable, and wherein for display furthermore following step is performed prior to step (a):
simultaneous selection of a plurality or all of columns of display elements to be filled,
so that subsequently plural or all columns and therefore display elements are filled simultaneously and the respective mechanisms for influencing the surface energy of the display liquid can be controlled simultaneously.

21. The method of claim 19, utilizing a device comprising a plurality of columns of display elements and further means for column selection or a respective number of liquid feeding mechanisms, wherein the respective mechanisms for influencing the surface energy are jointly controllable line by line, and wherein for display furthermore the following step is performed prior to step (a):
selection of a specific column of display elements to be filled, so that subsequently only this column and therefore its display elements are filled simultaneously and wherein the process is repeated by prior selection of a further specific column to be filled, until all desired columns have been selected.

22. The method of claim 19, wherein for updating of an image to be displayed further one of the following steps is included:
- selection of the tile to be filled;
- selection of the chamber layer to be filled and the display liquid;

wherein said step(s) are performed prior to step (a) and the entire sequence is repeated until the desired number of tiles or chamber layer is updated.

* * * * *

UNITED STATES PATENT AND TRADEMARK OFFICE
CERTIFICATE OF CORRECTION

PATENT NO.        : 8,693,080 B2
APPLICATION NO.   : 12/737786
DATED             : April 8, 2014
INVENTOR(S)       : Juergen Rawert It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 555 days.

Signed and Sealed this

Twenty-ninth Day of September, 2015

Michelle K. Lee
*Director of the United States Patent and Trademark Office*